(12) United States Patent
Nagely

(10) Patent No.: US 8,443,759 B2
(45) Date of Patent: May 21, 2013

(54) MOBILE CALF CARE STATION

(76) Inventor: Arnold G. Nagely, Maryville, KS (US)

( * ) Notice: Subject to any disclaimer, the term of this patent is extended or adjusted under 35 U.S.C. 154(b) by 445 days.

(21) Appl. No.: 12/880,585

(22) Filed: Sep. 13, 2010

(65) Prior Publication Data
US 2012/0060764 A1  Mar. 15, 2012

(51) Int. Cl.
*B60P 3/04* (2006.01)

(52) U.S. Cl.
USPC ......... 119/416; 119/512; 119/843; 296/24.31

(58) Field of Classification Search
USPC ........ 119/416, 400, 412, 512, 843; 296/24.31
See application file for complete search history.

(56) References Cited

U.S. PATENT DOCUMENTS

| | | | |
|---|---|---|---|
| 4,339,147 A * | 7/1982 | Kimzey ..................... | 296/24.31 |
| 4,530,538 A * | 7/1985 | Greene et al. ............. | 296/24.31 |
| 5,655,484 A | 8/1997 | Aaberg | |
| 5,769,478 A | 6/1998 | Vernese | |
| 5,890,453 A | 4/1999 | Waring-Brown | |
| 5,924,385 A | 7/1999 | Cossel | |
| 6,463,886 B1 | 10/2002 | Rodden et al. | |
| 6,679,673 B1 | 1/2004 | Stahler et al. | |
| 6,698,812 B1 * | 3/2004 | Stubbs ....................... | 296/24.31 |
| 6,886,494 B2 * | 5/2005 | Labrecque et al. .......... | 119/453 |
| 6,964,245 B2 * | 11/2005 | Beck ............................. | 119/512 |
| 7,216,605 B2 | 5/2007 | Cupps | |
| 7,237,510 B2 | 7/2007 | White | |
| 7,458,337 B2 * | 12/2008 | Callan .......................... | 119/165 |
| 2005/0241593 A1 | 11/2005 | Kaura | |
| 2009/0090306 A1 | 4/2009 | Miles | |
| 2009/0314217 A1 | 12/2009 | Hurwitz et al. | |

FOREIGN PATENT DOCUMENTS

| | | |
|---|---|---|
| AU | 2002 302009 | 2/2005 |
| WO | WO 9325406 | 12/1993 |

OTHER PUBLICATIONS

PCT Search Report and Written Opinion from PCT Application No. PCT/US2011/050679 entitled Mobile Calf Care Station (Dated Apr. 9, 2012).

* cited by examiner

*Primary Examiner* — Yvonne Abbott
(74) *Attorney, Agent, or Firm* — Hovey Williams LLP

(57) ABSTRACT

A mobile animal care station includes a wheeled chassis with an enclosure supported above the ground for movement to and from a treatment location. The enclosure defines a treatment space therein and presents an opening that permits ingress and egress relative to the treatment space. The enclosure presents an open bottom to permit animals within the enclosure to be supported directly on the ground. The mobile animal care station also includes a doorway restriction mounted along the opening to provide a doorway of the enclosure.

38 Claims, 13 Drawing Sheets

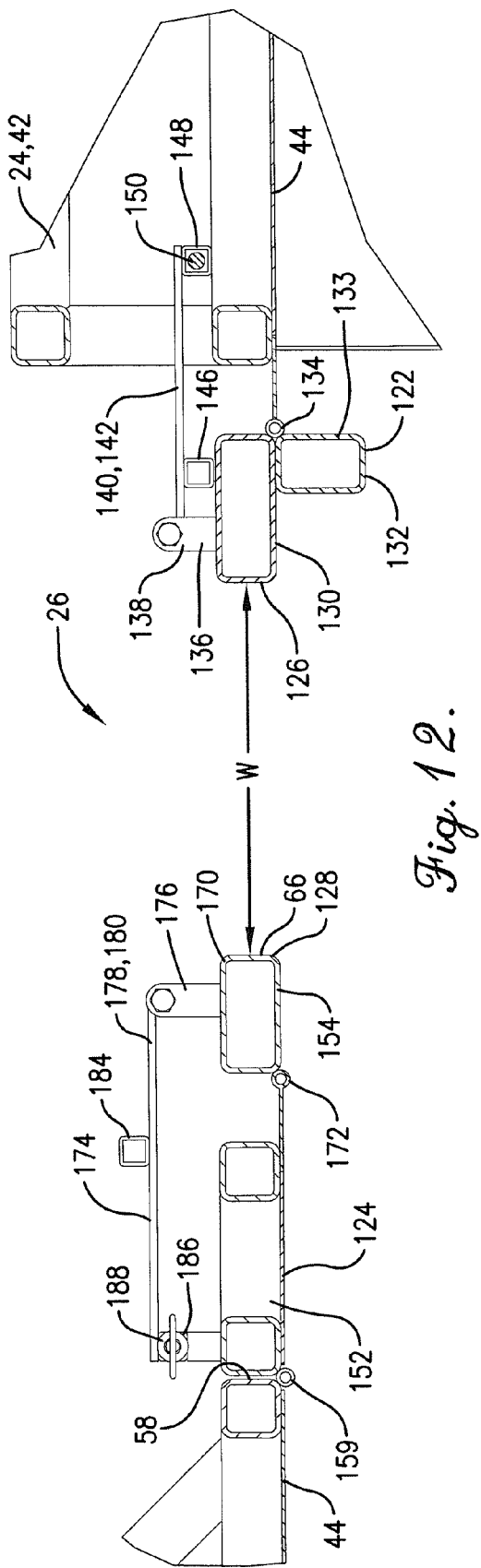
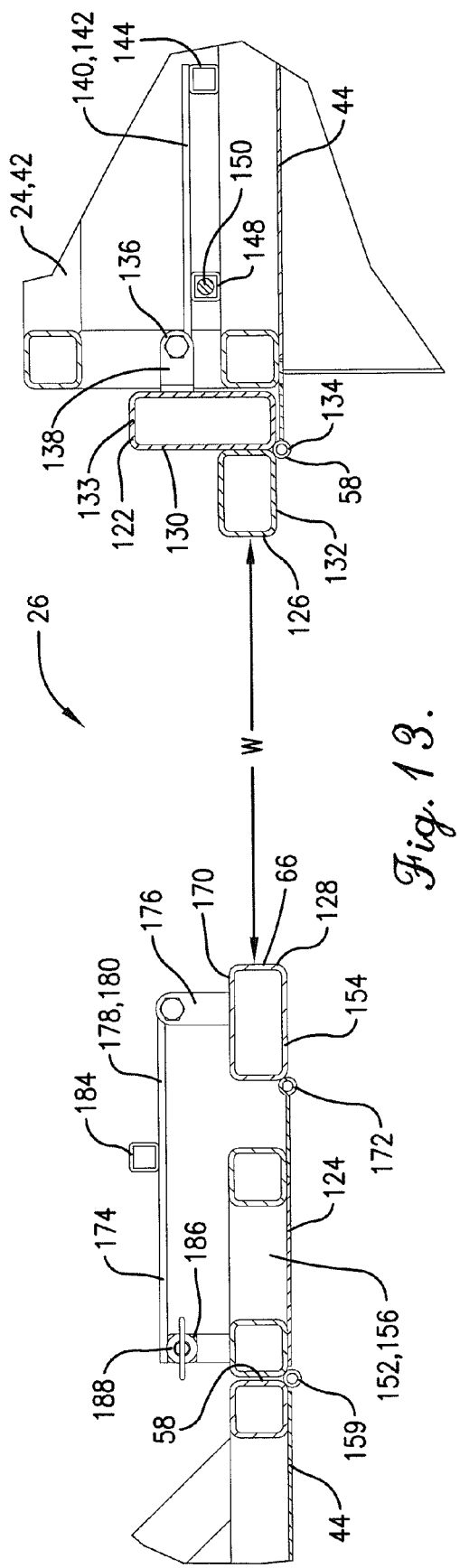
Fig. 12.
Fig. 13.

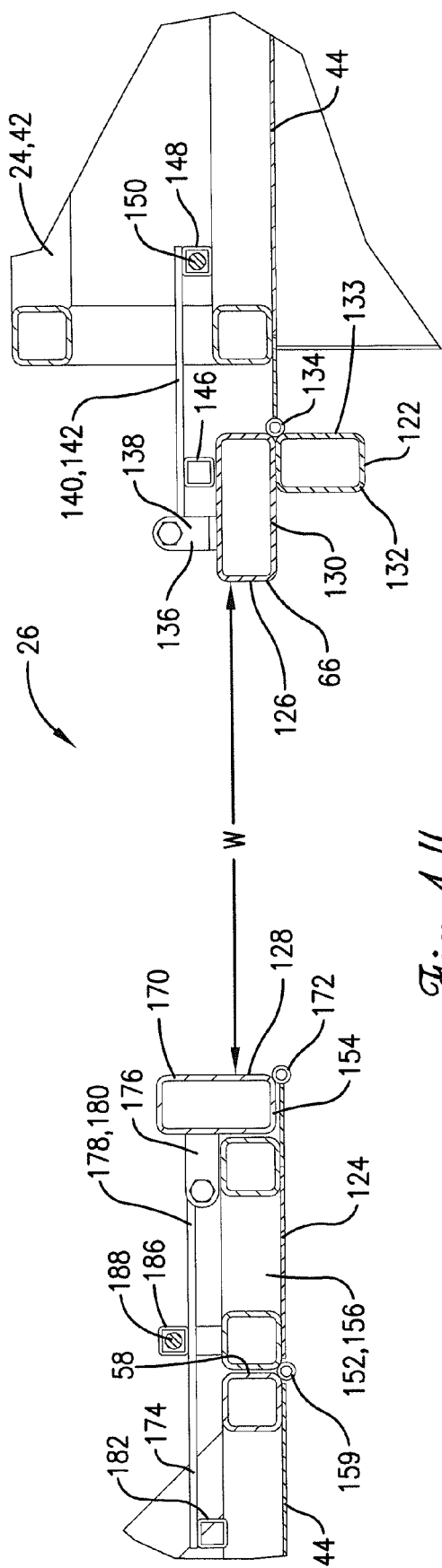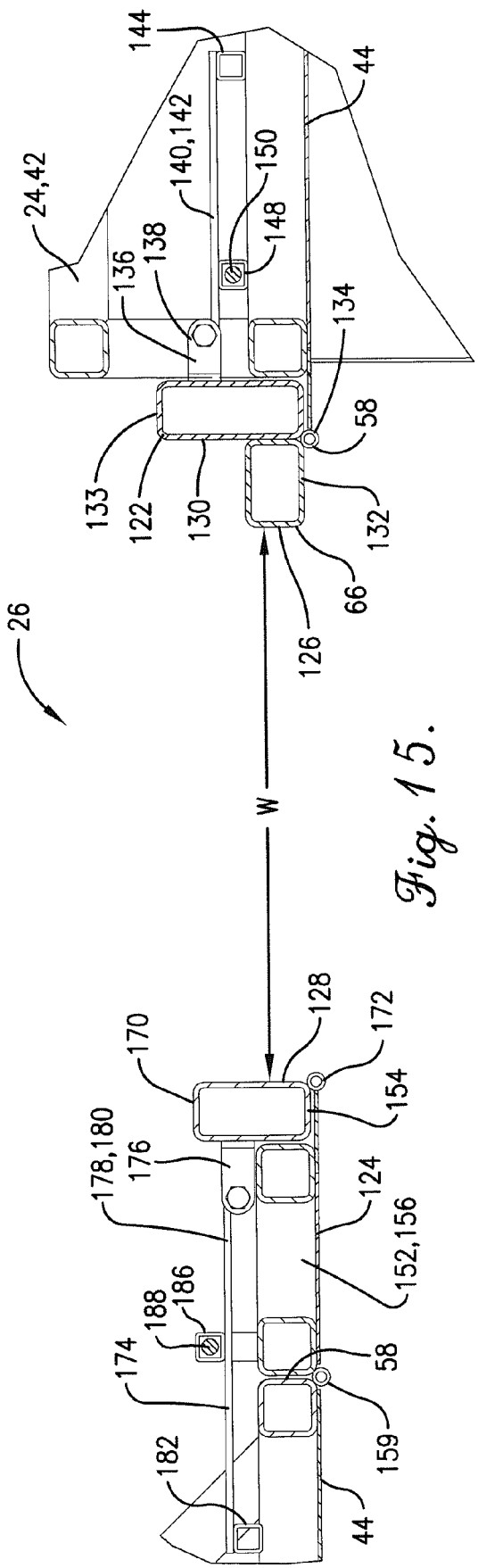

MOBILE CALF CARE STATION

BACKGROUND

1. Field

The present invention relates generally to a mobile enclosure with a doorway. Furthermore, embodiments of the present invention concern a mobile animal treatment vehicle with a doorway restriction that provides restricted access to a treatment area within the vehicle.

2. Discussion of Prior Art

People have long sought to observe and/or treat animals, whether tame or wild, in the animal's customary environment. This is particularly true of ranchers or farmers who raise livestock for a living. Large varieties of livestock, such as cattle or horses, are ubiquitous on North American farms and require periodic care. However, such animals often present a bodily threat to the care provider, particularly if an animal acts defensively and/or aggressively. A newborn bovine calf typically requires treatment, observation, and/or transportation by the owner soon after birth. However, the bovine mother will instinctively protect the calf from any intruder, including a human, and can potentially injure a human in close proximity to the calf. Movable pens and trailers are used by care providers to catch and observe cattle in remote locations.

Prior art trailers, mobile pens, and other vehicles are deficient at supporting the in situ treatment of animals by a care provider and suffer from certain undesirable limitations. For instance, care providers often must catch and treat newborn calves without the assistance of another person. When in the presence of an aggressive and/or defensive cow, it is difficult for the care provider to catch and hold the calf while avoiding contact with the cow, even when a prior art vehicle or pen is available. Furthermore, prior art pens and vehicles fail to provide a convenient treatment area that protects the care provider from a cow while providing the cow with limited access to the calf.

SUMMARY

The following brief summary is provided to indicate the nature of the subject matter disclosed herein. While certain aspects of the present invention are described below, the summary is not intended to limit the scope of the present invention.

Embodiments of the present invention provide a mobile animal care station that does not suffer from the problems and limitations of the prior art pens and vehicles set forth above.

A first aspect of the present invention concerns a mobile animal care station operable to be moved to an animal treatment location. The mobile animal care station broadly includes a wheeled chassis and a doorway restriction. The wheeled chassis includes an enclosure supported above the ground for movement to and from the treatment location. The enclosure defines a treatment space therein and presents an opening that permits ingress and egress relative to the treatment space and presents an opening width dimension. The enclosure presents an open bottom so that animals within the treatment space may be supported directly on the ground. The doorway restriction is mounted along at least one side of the opening to provide a doorway having a doorway width dimension that is less than the opening width dimension so as to restrict animal ingress and egress. The doorway restriction includes a panel that extends along the doorway to at least partly define a panel width dimension. The panel width dimension is less than the opening width dimension so that the doorway restriction is incapable of fully spanning the width of the doorway. The doorway restriction is shiftably mounted so that the doorway is adjustably-sized.

A second aspect of the present invention concerns a mobile animal care station operable to be moved to an animal treatment location. The mobile animal care station broadly includes a wheeled chassis. The wheeled chassis includes an enclosure supported above the ground for movement to and from the treatment location. The enclosure defines a treatment space therein and presents a restricted access doorway that permits operator ingress and egress relative to the treatment space. The enclosure presents an open bottom so that animals within the treatment space may be supported directly on the ground. The doorway has a maximum doorway width dimension of about nineteen inches. The mobile animal care station is devoid of structure directly below the doorway so that the doorway extends continuously from an upper end thereof to the ground without interruption.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 1 is a left rear perspective of an animal treatment trailer constructed in accordance with a preferred embodiment of the present invention, with the trailer including chassis components, an enclosure, adjustable left and right door assemblies, and a sling assembly, showing a rear access door and rear compartment gate of the enclosure in a closed position, and further showing single and dual panel assemblies of the left door assembly, with the dual panel assembly closed;

Figure 9:
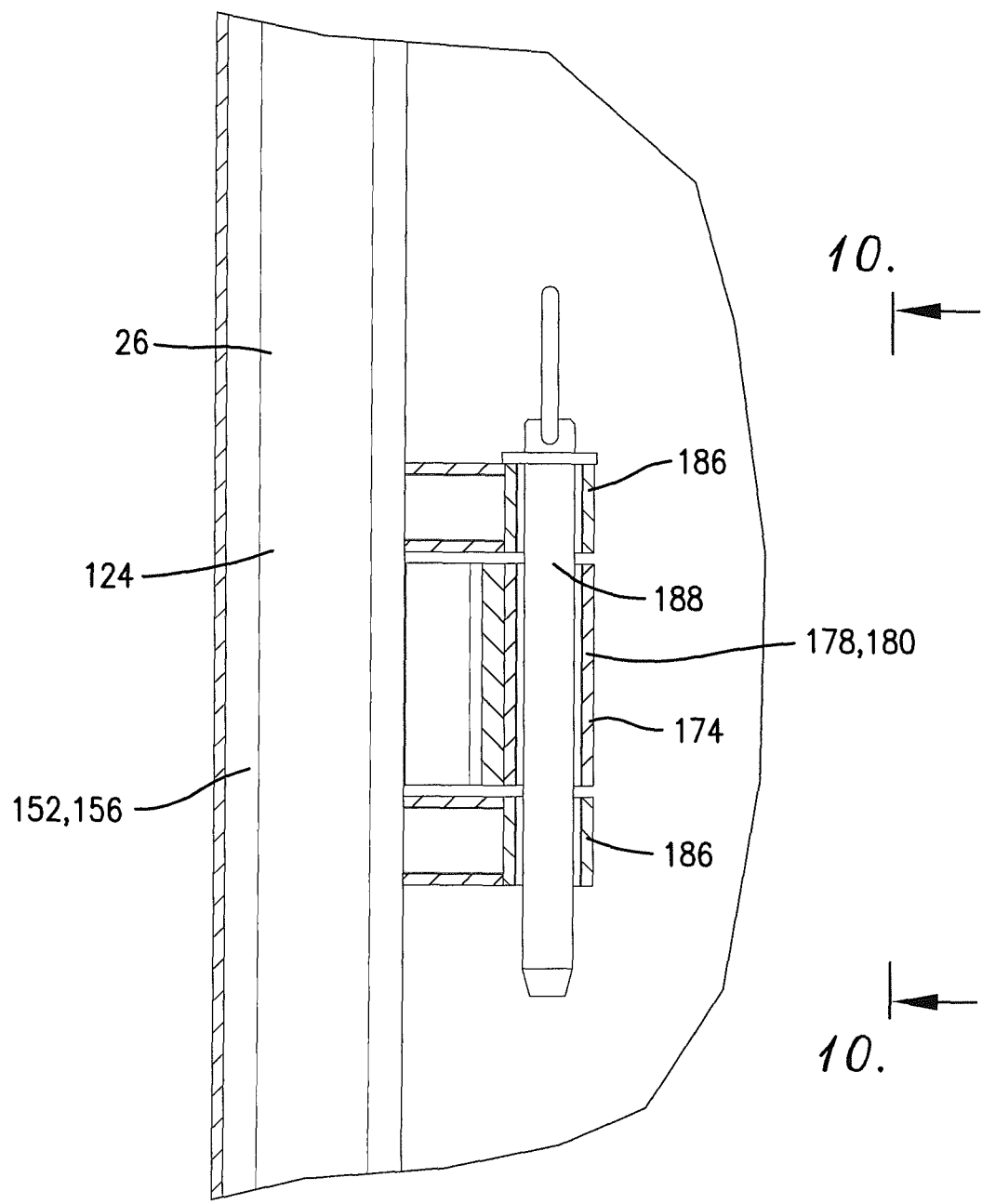
FIG. 9 is a fragmentary cross section of the animal treatment trailer taken along line 9-9 in FIG. 7, showing a latch assembly that secures an extension panel of the dual panel assembly relative to the base panel, with a pin extending through the latch bar of the latch assembly and a bracket of the base panel so that the extension panel is latched in a retracted position.
Figure 10:
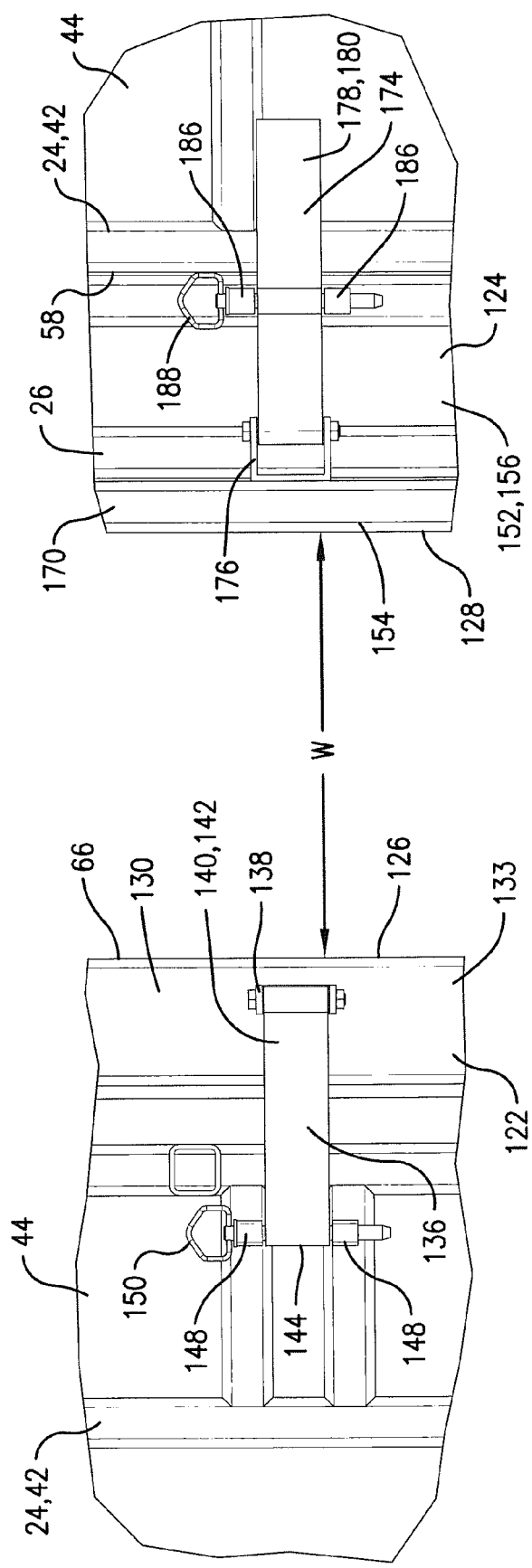
Figure 11:
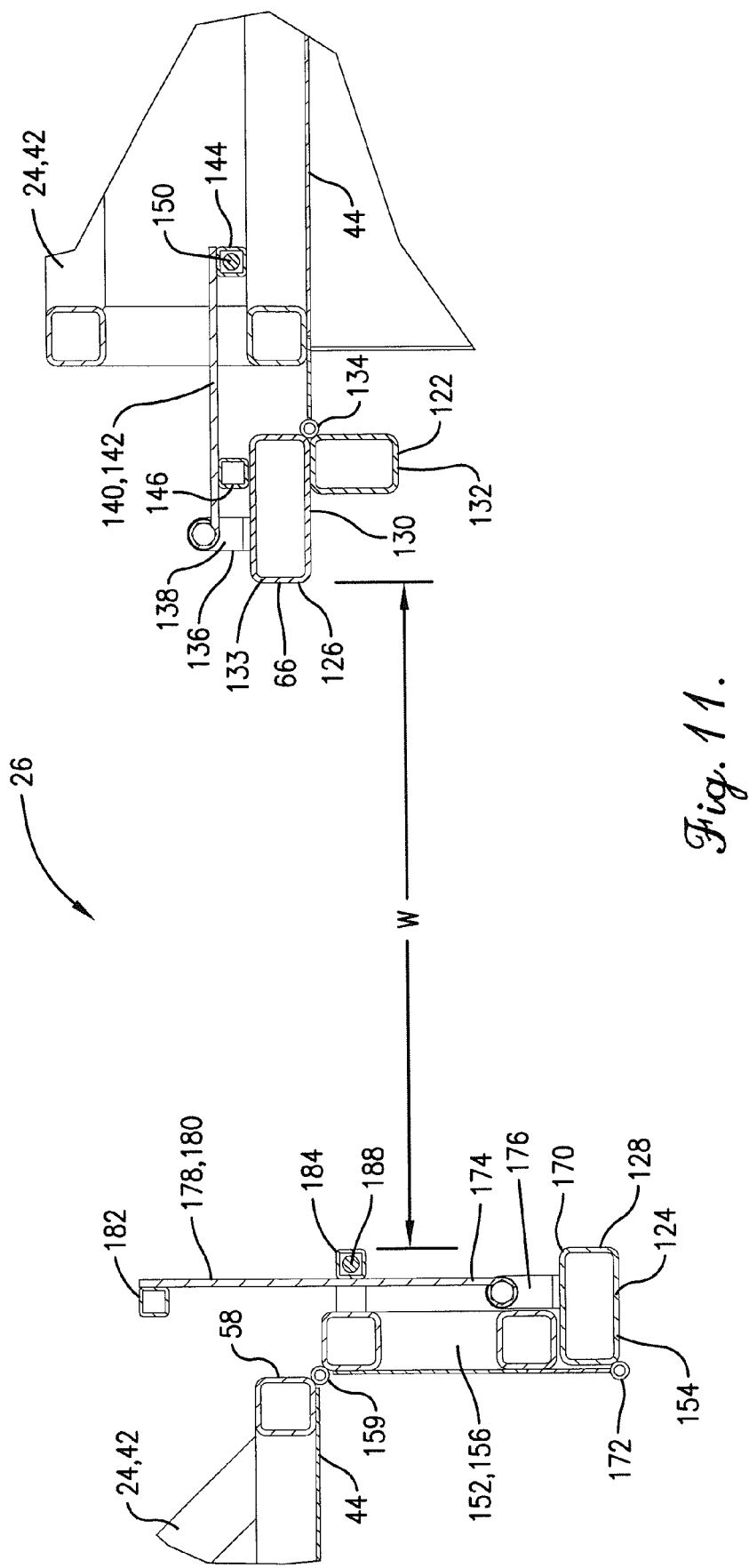

FIG. 10 is a fragmentary cross section of the animal treatment trailer taken along line 10-10 in FIG. 9, showing the latch assembly holding the extension panel in the retracted position, and showing another latch assembly that secures an extension panel of the single panel assembly relative to the enclosure, with the extension panel of the single panel assembly being latched in an extended position;

FIG. 11 is a fragmentary cross section of the animal treatment trailer shown in FIGS. 1-10, showing single and dual panel assemblies of the left door assembly attached to the front and side walls of the enclosure, with the dual panel assembly pivoted into an open position, the extension panel of the dual panel assembly retracted, and the extension panel of the single panel assembly extended;

FIG. 12 is a fragmentary cross section of the animal treatment trailer similar to FIG. 11, but with the dual panel assembly pivoted into a closed position and the extension panel of the dual panel assembly extended;

FIG. 13 is a fragmentary cross section of the animal treatment trailer similar to FIG. 12, but with the extension panel of the single panel assembly retracted;

FIG. 14 is a fragmentary cross section of the animal treatment trailer similar to FIG. 12, but with the extension panel of the dual panel assembly retracted; and FIG. 15 is a fragmentary cross section of the animal treatment trailer similar to FIG. 13, but with the extension panel of the dual panel assembly retracted.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Turning initially to FIGS. 1-4, an animal treatment trailer 20 provides a mobile enclosure for observation, transport, and/or medical treatment of an animal. The illustrated trailer 20 is preferably configured for in situ, neonatal care of bovine animals. The trailer 20 has been found to be particularly useful as an enclosed care station for newborn calves because the enclosure permits efficient ingress and egress by the care provider and, at the same time, protects the newborn calf and care provider from harm or intrusion by other members of a herd, including the calf's mother. However, the principles of the present invention are applicable where the trailer 20 is used for veterinary purposes in connection with other animals. Trailer 20 broadly includes, among other things, chassis components 22, an enclosure 24, and adjustable door assemblies 26.

The trailer 20 is preferably configured to be towed by another vehicle (not shown) to various treatment locations for in situ care. However, the principles of the present invention are applicable where the illustrated enclosure 24 is incorporated into a self-powered vehicle, such as a conventional truck. The chassis components 22 support the enclosure 24 in a position spaced above a treatment location L and permit wheeled travel across the ground. The components 22 preferably include a split axle assembly 28, a tongue 30, and a hitch 32. As will be shown, the enclosure 24 preferably interconnects the axle assembly 28 and tongue 30 to provide part of the overall wheeled chassis structure.

The split axle assembly 28 preferably includes a pair of wheels 34 and a pair of axles 36 to shift the wheels 34 vertically relative to the enclosure 24. The axles 36 include an axle body and a spindle offset from the axle body and shiftable relative thereto. The axles 36 are mounted to corresponding sides of the enclosure 24, and the axle assembly 28 is preferably mounted between front and rear ends 38,40 of the enclosure 24. The illustrated axle arrangement cooperatives with the open bottom of the enclosure 24 so that animals can be supported on the ground within the enclosure. However, for some aspects of the present invention, the trailer 20 could have an alternative axle arrangement.

The tongue 30 is conventional and includes two beams fixed to the front end of the enclosure 24. The beams extend forwardly from the enclosure 24 and are fixed to the hitch 32. The hitch 32 is conventional and is removably and pivotally supported on a hitch receiver (not shown) of a vehicle. Thus, the axle assembly 28, enclosure 24, tongue 30, and hitch 32 are preferably interconnected with one another and cooperatively provide a wheeled trailer chassis.

Turning to FIGS. 1-7, the enclosure 24 presents an enclosed treatment space S above the treatment location L. As will be discussed further, the enclosure 24 also includes various features to house equipment for animal treatment (e.g., veterinary procedures).

The illustrated enclosure 24 includes, among other things, a frame assembly 42, a covering 44 secured along the sides of frame assembly 42, and a translucent roof panel 46. The frame assembly 42, covering 44, and roof panel 46 cooperatively provide front and rear walls 48,50, left and right side walls 52,54, and a roof 56 that are integrally fixed to one another so that the frame assembly 42 is substantially rigid. The walls 48,50,52,54 and roof 56 each preferably include a plurality of tubular members made of carbon steel and welded to one another, although the walls and roof could include other types of structural components and/or components made of other materials (e.g., to provide suitable structural rigidity).

Preferably, the roof panel 46 includes a translucent material so that the roof 56 allows ambient light to pass into the treatment space S. More preferably, the roof panel 46 is made of BULITEX® translucent roof panel material, which is manufactured by U.S. Liner Company, of Ambridge, Pa. Thus, the roof 56 covers the treatment space S to shield the user from weather elements while allowing light into the enclosure 24.

The enclosure 24 presents left and right side openings 58,60, rear access opening 62, and rear compartment opening 64 that permit ingress and egress relative to the enclosure 24. The enclosure 24 further presents an open bottom 65 that extends along a bottom margin of the enclosure 24 (see FIGS. 5 and 6). As will be explained, this open-bottom enclosure configuration provides a convenient structure for in situ animal treatment. The side openings 58,60 are positioned between corresponding side walls 52,54 and the front wall 48. The illustrated side openings 58,60 are preferably positioned the same distance from the front end 38 of the enclosure 24. As will be discussed, the side openings 58,60 are configured to receive the adjustable door assemblies 26 to provide oppositely-positioned adjustable-width doorways 66.

With the open-bottom arrangement, the trailer 20 is preferably devoid of structure directly below the doorways 66 so that the doorway extends continuously from an upper end adjacent the roof 56 to the ground along treatment location L without interruption. In this manner, the care provider (and, when appropriate, the newborn calf) can pass into and out of the enclosure while remaining supported by the ground. That is, enclosure ingress and egress is preferably permitted without the care provider having to step or climb onto (or off of) trailer structure. However, the illustrated trailer could have an alternative doorway configuration with respect to some aspects of the present invention.

The enclosure 24 includes a door 70 pivotally mounted in the rear access opening 62 and a gate 72 pivotally mounted in rear compartment opening 64. The door 70 is urged into a closed position by a spring mechanism 74 and permits enclosure ingress and egress by the care provider (see FIG. 4).

Turning to FIGS. 3-6, the enclosure 24 further includes interior walls 76 fixed to the right side wall 54 and rear wall 50, a compartment bottom 78, and an interior compartment door 80 mounted to the rear wall 50. The interior walls 76, door 80, and gate 72 cooperatively define a rear compartment 82 (see FIGS. 3 and 4). The rear compartment 82 is configured to receive a calf (not shown). Furthermore, the compartment 82 can be accessed from inside or outside the enclosure 24. The door 80 is pivotally attached to the rear wall 50 and pivots between open and closed door positions to allow access to the compartment 82 from within the enclosure 24. The gate 72 pivots between open and closed gate positions to permit selective access to the compartment from outside the enclosure 24. The gate 72 also presents openings 84 so that the calf can be viewed from outside the enclosure. This arrangement permits the cow to remain adjacent to and in communication (e.g., through visual or aural communication) with the calf during treatment, observation, transportation (or combinations thereof) of the calf by the care provider while restricting access to the treatment space S by the cow. For instance, if the calf requires further treatment at an offsite facility (e.g., barn or shed), the illustrated construction allows communication between the cow and calf as the trailer is used to transport the calf (e.g., so that the cow will follow the trailer).

Figure 5:
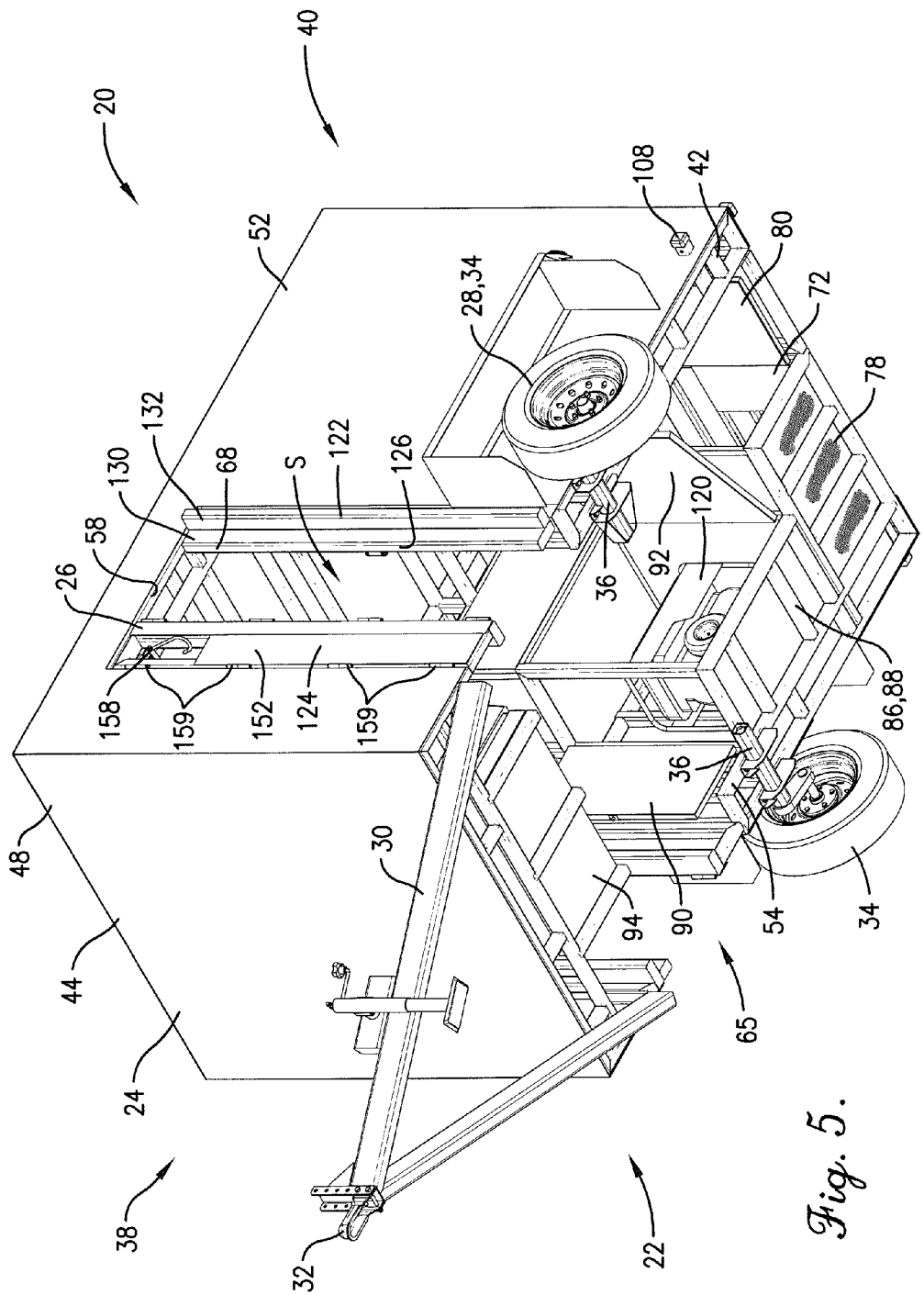
FIG. 5 is a lower left front perspective of the animal treatment trailer shown in FIGS. 1-4, showing an open bottom of the enclosure and a treatment space defined within the enclosure, and further showing a cabinet mounted within the enclosure, with cabinet doors swung open to depict a generator mounted within the cabinet.
Figure 6:
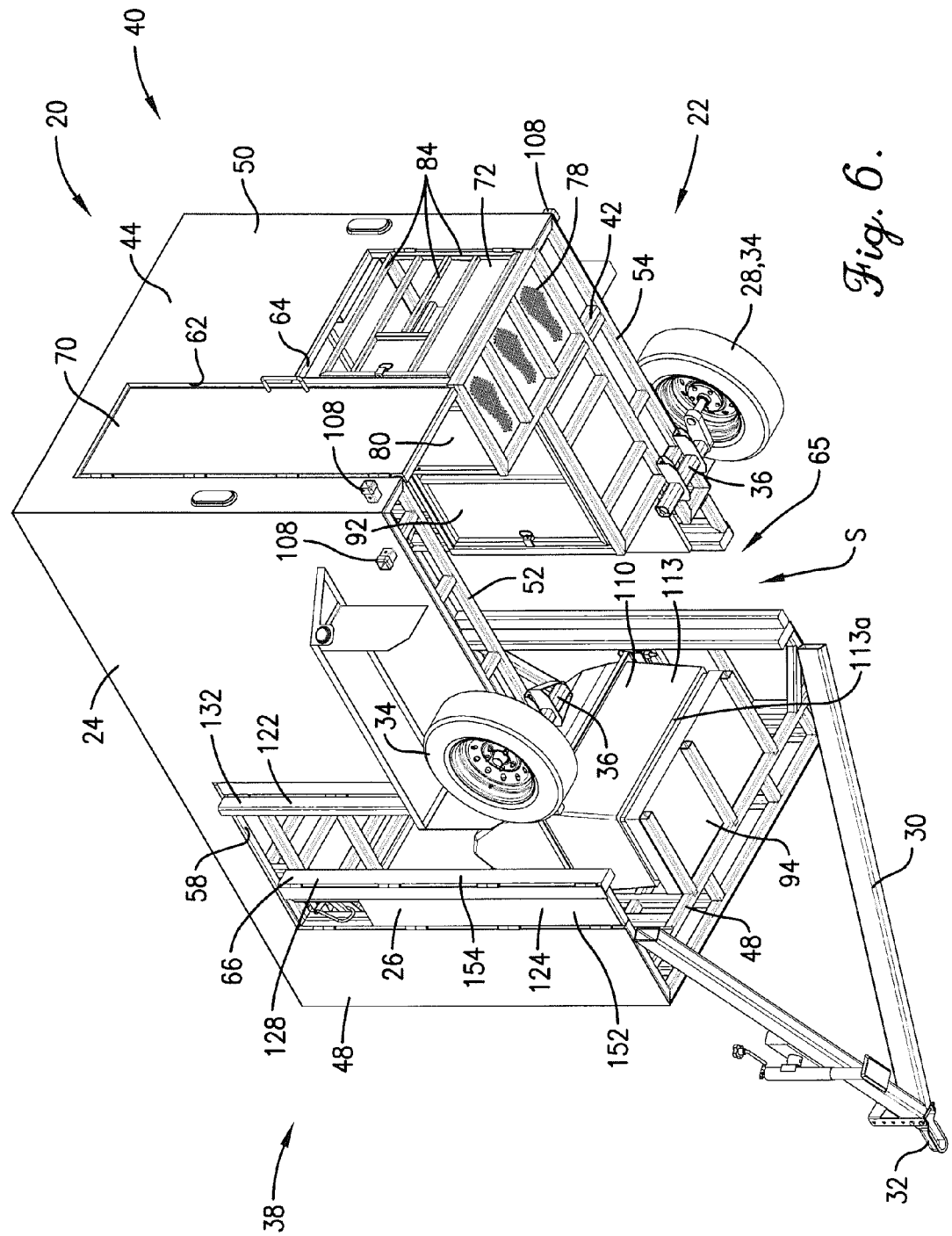
FIG. 6 is a lower left rear perspective of the animal treatment trailer shown in FIGS. 1-5, showing a front platform mounted to a front wall of the enclosure within the treatment space, with a calf-warming box mounted on the front platform.
Figure 7:
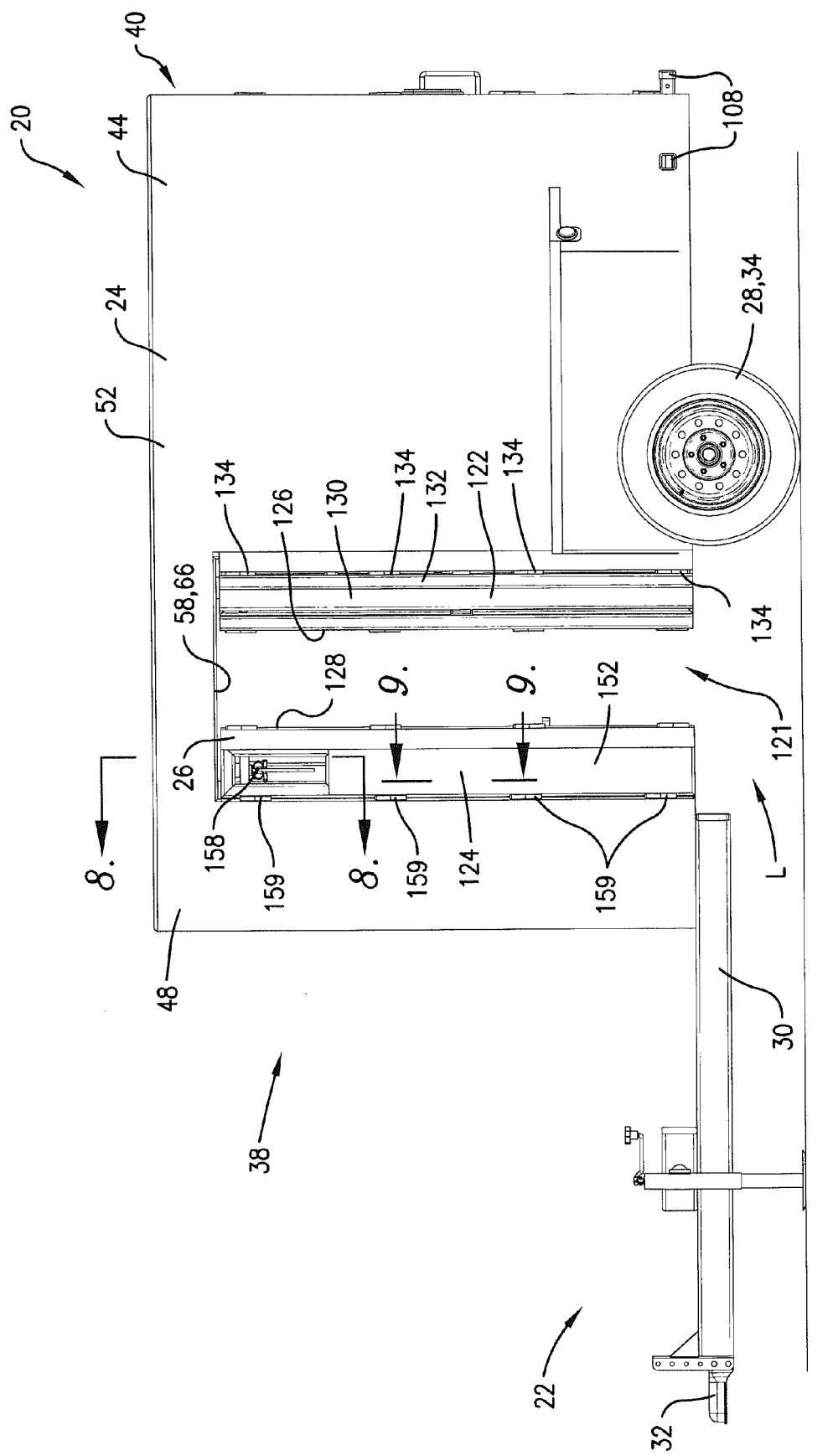
FIG. 7 is a left side elevation of the animal treatment trailer shown in FIGS. 1-6.

The enclosure 24 also includes a cabinet assembly 86 with a frame 88 fixed to the right side wall 54 and doors 90,92 mounted to the frame 88 (see FIG. 5). The enclosure 24 further includes a front platform 94 mounted to the front wall 48 within the treatment space S (see FIG. 6). As will be discussed, the cabinet receives a generator and the platform 94 receives a calf-warming box.

The trailer 20 preferably includes other equipment to support animal treatment procedures. For instance, the illustrated trailer 20 includes a sling assembly 96 to hold an animal in a position exterior to the enclosure 24. The sling assembly 96 includes a bracket 98, a beam 100 adjustably supported by the bracket 98, and a sling 102 removably supported by the beam 100. The beam 100 includes an L-shaped member 104 and a cross-member 106 fixed to the end of the L-shaped member 104. The sling 102 includes opposite ends with hooks that are removably attached to the beam 100. In the illustrated embodiment, one end of the sling 102 has two hooks that are attached to opposite ends of the cross-member 106. The other end of the sling 102 has a single hook that is attached to a loop fixed to the end of the L-shaped member 104.

The beam 100 is adjustably mounted at one end thereof to the bracket 98 and extends outwardly from the bracket 98. The enclosure 24 preferably includes a plurality of tubular mounts 108 attached to the rear wall 50 and side walls 52,54. The mounts 108 are each configured to receive the tubular male end of the bracket 98. Thus, the care provider can selectively position the sling assembly 96 in different positions along the rear end 40 of the enclosure 24. It is also within the scope of the present invention where the sling assembly 96 is positioned and supported at other locations along the enclosure 24. Similar to the calf compartment, the sling permits the cow to remain adjacent to and in communication with the calf during treatment, observation, and/or transportation of the calf by the care provider while restricting access to the treatment space S by the cow.

The illustrated trailer 20 further includes a calf-warming box 110 mounted on the front platform 94. The calf-warming box 110 has a housing with a body 112 and an adjustable lid 114 pivotally mounted on the body 112. The body 112 includes a front wall 113 that is pivotally attached to the body 112 (see FIG. 6). The front wall 113 has a lower margin 113a that is attached to a remainder of the body 112 with a laterally extending hinge (not shown) that permits the front wall 113 to fold downwardly from the illustrated closed wall position. The lid 114 is pivotally attached to an upper margin of a rear wall (not shown) of the body 112 so that the lid 114 can be pivoted upwardly from the illustrated closed lid position.

The housing also presents an opening 116 at one end thereof. The box 110 further includes a heating element (not shown) positioned within the housing to maintain an elevated temperature therein. When a calf is positioned in the box 110, the opening 116 allows the neck of the calf to extend out of the housing. The box 110 also includes a flexible cover 118 secured over the opening 116. The cover 118 flexes to allow the neck of the calf to extend through the housing.

The trailer 20 also preferably includes a conventional generator 120 mounted in the cabinet 86 (see FIG. 5). In the usual manner, the generator 120 provides electrical power for the warming box 110 and other electrical devices to be used by the care provider.

As mentioned, the side openings 58,60 are configured to receive the adjustable door assemblies 26 to provide doorways 66. Preferably, the side openings 58,60 are generally positioned the same distance from the front end 38. Thus, the enclosure 24 and door assemblies 26 cooperatively provide a continuous alley 121 that runs from one doorway 66 to the other doorway 66 (see FIG. 7).

In the illustrated embodiment, the doorways 66 are positioned so that the alley 121 extends laterally at a location spaced between the hitch 32 and axle assembly 28. Due to the preferred open-bottom configuration of the enclosure 24, the alley 121 separates the enclosure 24 into front and rear sections that are interconnected by the roof 56. Furthermore, the illustrated enclosure 24 has front and rear sections that are solely connected by the roof 56. The frame of the roof 56 includes multiple tubular sections welded together to form a truss structure. The truss structure resists bending of the roof 56 (due to the weight of the enclosure sections and other forces applied to the enclosure), particularly the portion of roof 56 directly above the alley 121. In this manner, the trailer 20 provides an open bottom enclosure 24 with doorways 66 to access the enclosure 24.

The illustrated alley 121 extends laterally between the hitch 32 and split axle assembly 28. However, it is also within the ambit of the present invention where the doorways 66 are alternatively positioned. For instance, the doorways 66 and alley 121 could be positioned rearwardly of the split axle assembly 28. The trailer 20 could also be configured to include a single doorway 66, e.g., to further limit access to the treatment space S.

Turning to FIGS. 7-15, the door assemblies 26 provide a restriction to enclosure ingress and egress. When a care provider treats a calf in situ, particularly newborn calves, the calf's mother or other members of the herd can act defensively to protect the calf and, in some instances, can be dangerously aggressive toward the care provider. Such actions can present a minor distraction to the care provider or a serious physical threat. The illustrated door assemblies are preferably designed to allow ingress and egress by the care provider while restricting animals from entering the enclosure 24, as will be discussed below.

The depicted trailer 20 preferably has a pair of identical left and right door assemblies 26. Each of the illustrated door assemblies 26 preferably includes single and dual panel assemblies 122,124. As will be discussed, the illustrated panel assemblies 122,124 preferably present adjustable side margins 126,128 that define a doorway width dimension W, and the panel assemblies are preferably adjustable to change the doorway width dimension W. However, concerning some aspects of the present invention, the trailer 20 may have structure alternative to the door assemblies 26 to define the doorway width. Because the door assemblies 26 are substantially identical to one another, reference will be made primarily to the door assembly 26 mounted on the left hand side of enclosure 24.

Turning to FIGS. 10-15, the single panel assembly 122 provides an adjustably positioned margin 126. The single panel assembly 122 includes an elongated wide stanchion 130 and an elongated narrow stanchion 132 fixed to one another to provide an adjustable extension panel 133. The extension panel 133 is pivotally mounted to the left side wall 52 at hinge joints 134 (for the right door assembly 26, the stanchions are pivotally attached to the front wall 48). The extension panel 133 is pivotal into and out of a retracted position where the wide stanchion 130 is received in a recess in the enclosure wall (see FIGS. 13 and 15). The extension panel 133 is also pivotal into and out of an extended position (see FIGS. 12 and 14).

The single panel assembly 122 preferably includes a latch assembly 136 including a bracket 138 fixed to the wide stanchion 130 and a latch bar 140. The latch bar 140 includes a body 142 with a hinged end pivotally mounted to the bracket 138. The latch bar 140 also includes a pair of sockets, with an endmost socket 144 attached to the body 142 opposite the hinged end and an intermediate socket 146 attached to the body 142 between the hinged end and endmost socket 144.

The latch bar 140 is adjustable to secure the extension panel 133 to the left side wall 52 in one of the extended and retracted positions. The side wall 52 includes a tubular bracket 148 adjacent the single panel assembly 122. The latch bar 140 is secured in the retracted position by aligning the socket 146 with the tubular bracket 148 and extending a pin 150 through the socket 146 and bracket 148. Similarly, the latch bar 140 is secured in the extended position by aligning the endmost socket 144 with the tubular bracket 148 and extending pin 150 through the endmost socket 144 and bracket 148.

The illustrated latch mechanism is preferred for securing the single panel assembly 122 in one of the extended and retracted positions. However, the latch assembly 136 could be alternatively configured to secure the single panel assembly 122 without departing from the scope of the present invention. For instance, the latch bar 140 could be pivotally secured to the side wall 52 and selectively attached to the extension panel 133 with pin 150.

It is also within the ambit of the present invention where the single panel assembly 122 is alternatively configured to provide an adjustably-positioned side margin. For example, the panel assembly 122 could be configured similarly to the dual panel assembly 124. Furthermore, the extension panel 133 could be slidably mounted to side wall 52 so as to slide between the extended and retracted positions. Yet further, for some aspects of the present invention, the panel assembly 122 could be fixed relative to enclosure to restrict enclosure ingress and egress.

Turning to FIGS. 7-15, the dual panel assembly provides the adjustably positioned margin 128 and includes a base panel 152 and an extension panel 154. The base panel 152 includes a unitary panel body 156 and a latch assembly 158. The panel body 156 is pivotally mounted to the front wall 48 by hinge joints 159 and is pivotal between a closed position (see FIGS. 12-15) and an open position (see FIG. 11). Again, for the right door assembly 26, the panel body 156 is pivotally attached to the side wall 54.

Figure 8:
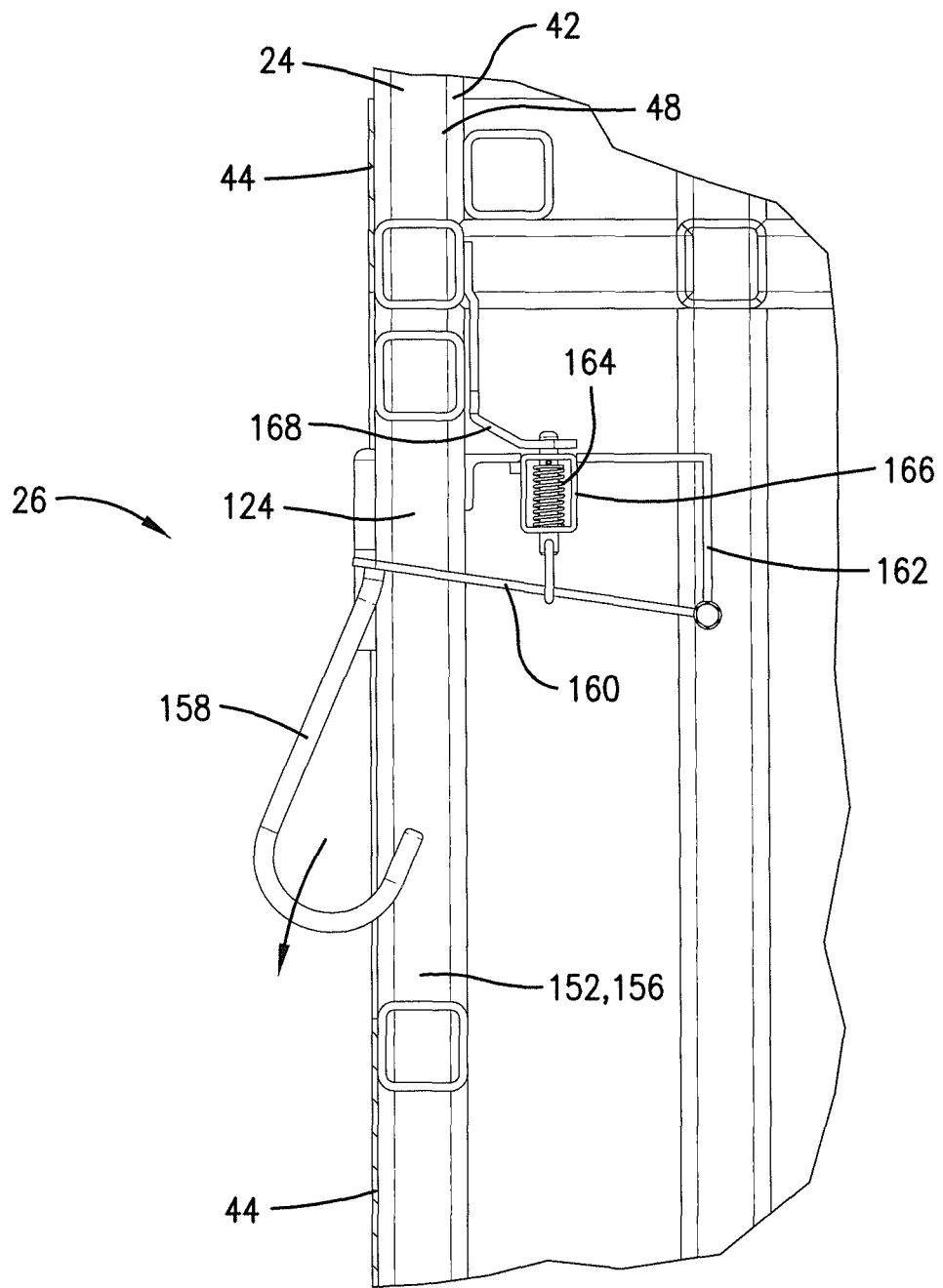
FIG. 8 is a fragmentary cross section of the animal treatment trailer taken along line 8-8 in FIG. 7, showing a latch mechanism that secures a base panel of the dual panel assembly relative to the enclosure, with the latch mechanism being mounted to the base panel and being latched to hold the dual panel assembly in the closed position.

Turning to FIG. 8, the latch assembly 158 is preferably operably mounted to the panel body 156 adjacent an upper end thereof. The latch assembly 158 includes an arm 160 pivotally mounted to a bracket 162 of the panel body 156. The latch assembly 158 further includes a spring-loaded pin assembly 164 mounted to another bracket 166 of the panel body 156. The pin of pin assembly 164 is normally resiliently urged into an uppermost locking position where an upper end of the pin projects upwardly out of the bracket 166. The pin is attached to the arm 160 so that downward movement of the arm 160 urges the pin out of the locking position.

The pin locks the base panel 152 in the closed position by extending through a strike plate 168 mounted to the front wall 48. The panel body 156 can be unlocked by shifting the arm 160 downwardly until the pin disengages the strike plate 168. Furthermore, the base panel 152 can be pivoted out of the closed position by holding the pin in the disengaged position and pivoting the base panel 152 outwardly. The arm 160 can be released once the pin is shifted laterally out of the hole in the strike plate 168. The base panel 152 can be returned to the closed position by pivoting the base panel 152 inwardly. The pin is configured to follow the strike plate 168, with the spring permitting downward pin movement. Once the pin reaches the strike plate hole, the spring urges the pin into the locked position.

The illustrated latch assembly 158 is preferred for securing the base panel 152 in one of the open and closed positions. However, the latch assembly 158 could be alternatively configured to secure the base panel 152 without departing from the scope of the present invention.

Figure 1:
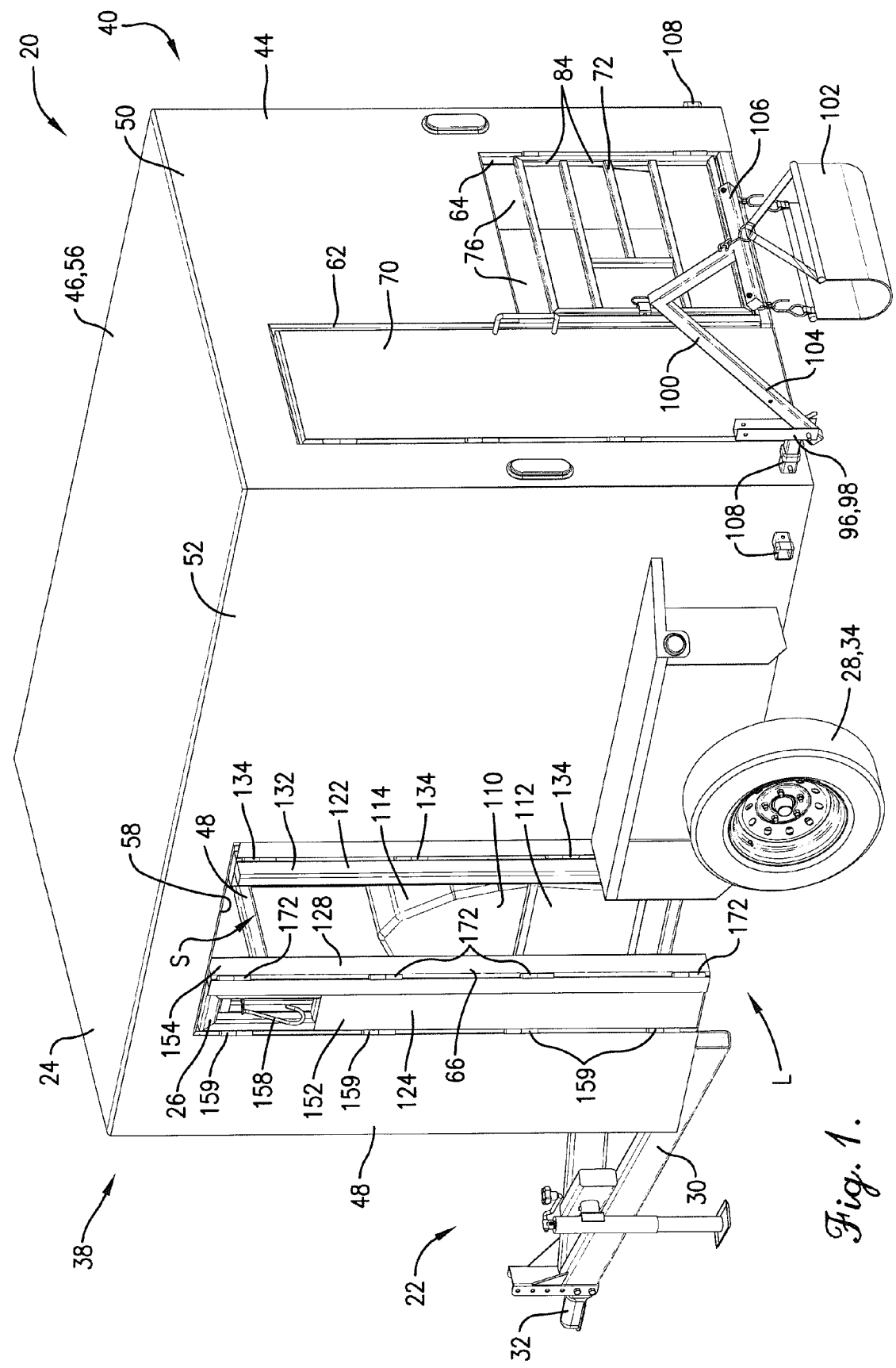
Figure 2:
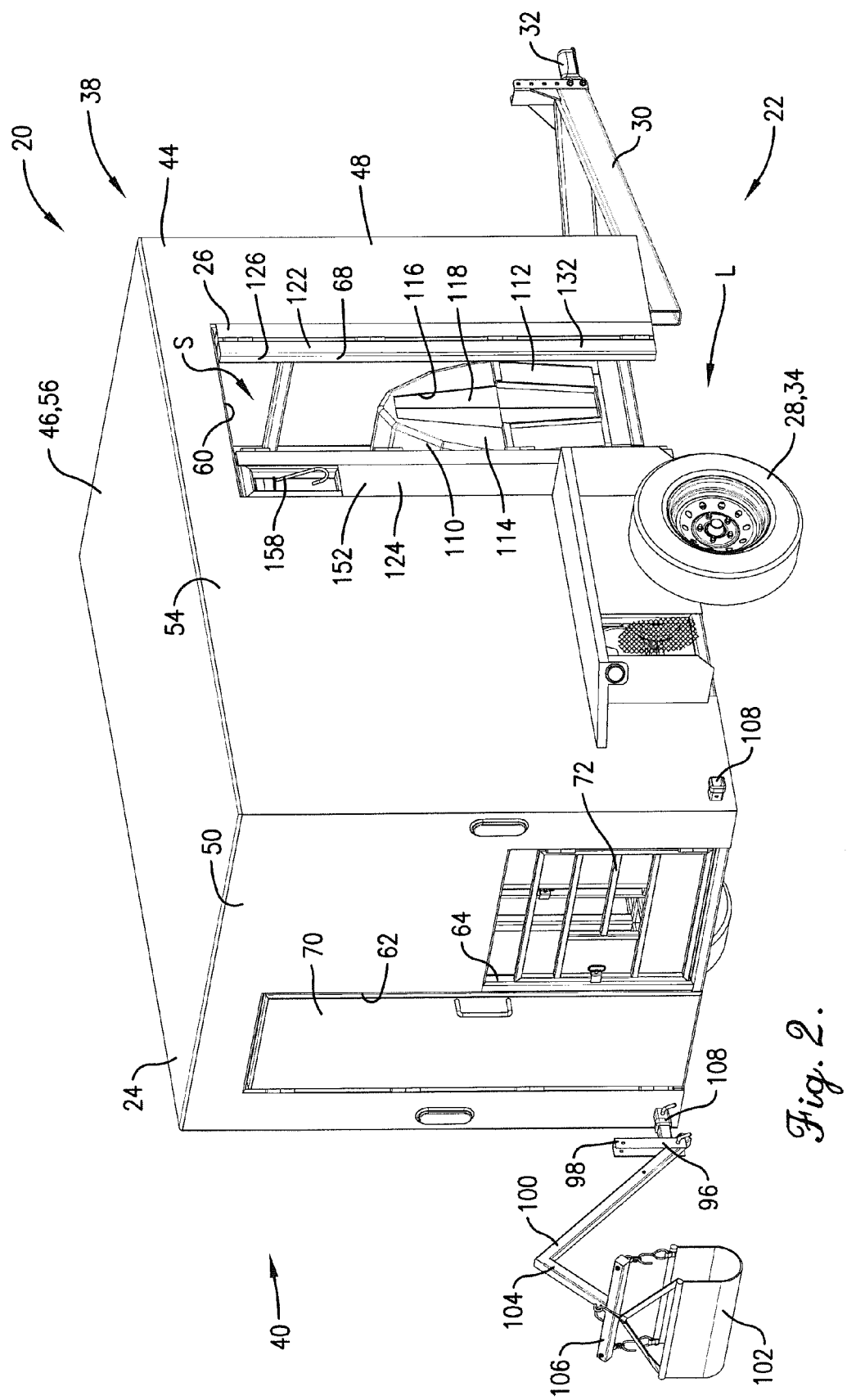
FIG. 2 is a right rear perspective of the animal treatment trailer shown in FIG. 1.
Figure 3:
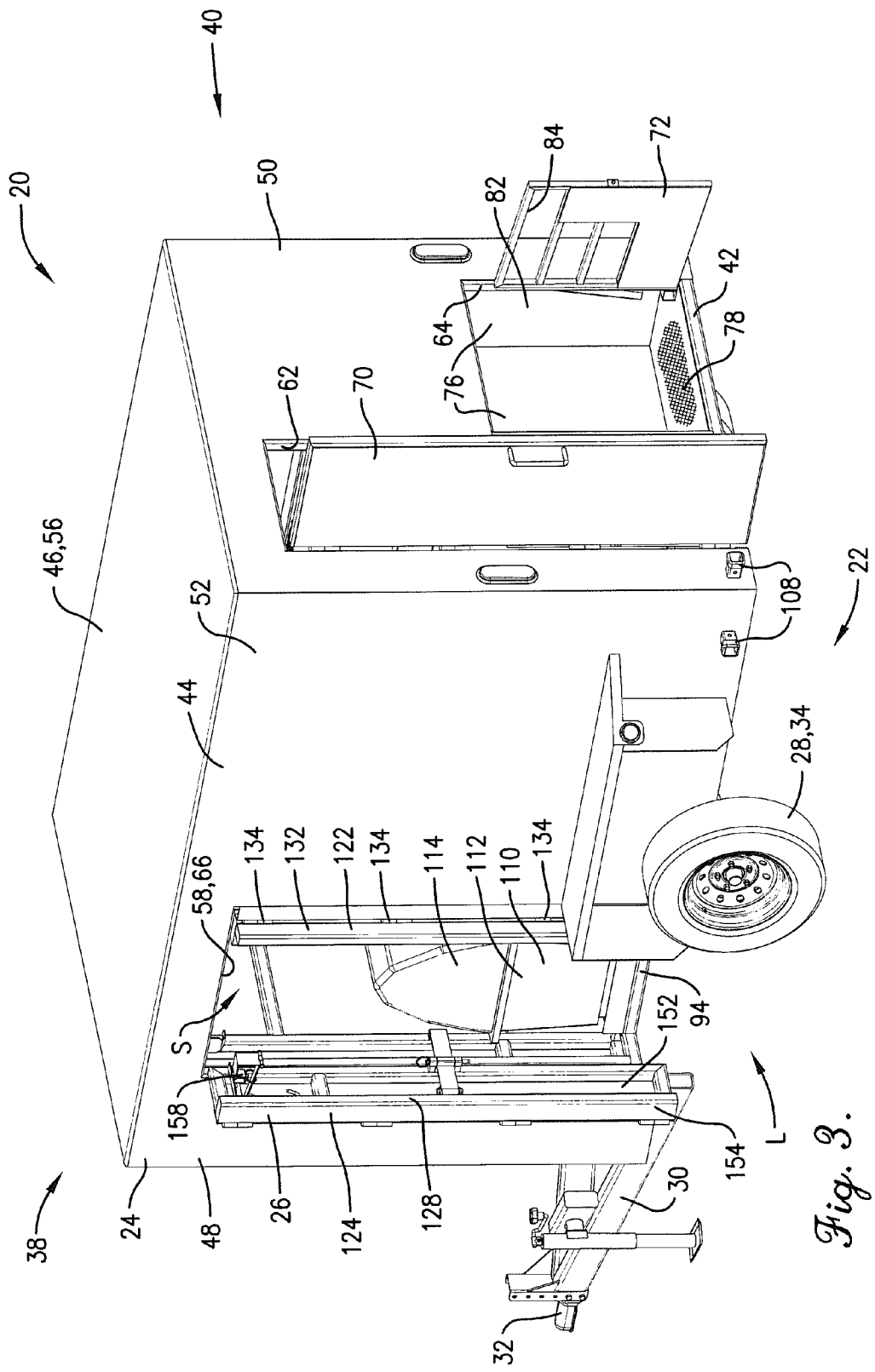
FIG. 3 is a left rear perspective of the animal treatment trailer shown in FIG. 1, but with the sling assembly removed, the dual panel assembly opened, and the rear access door and rear compartment gate opened.
Figure 4:
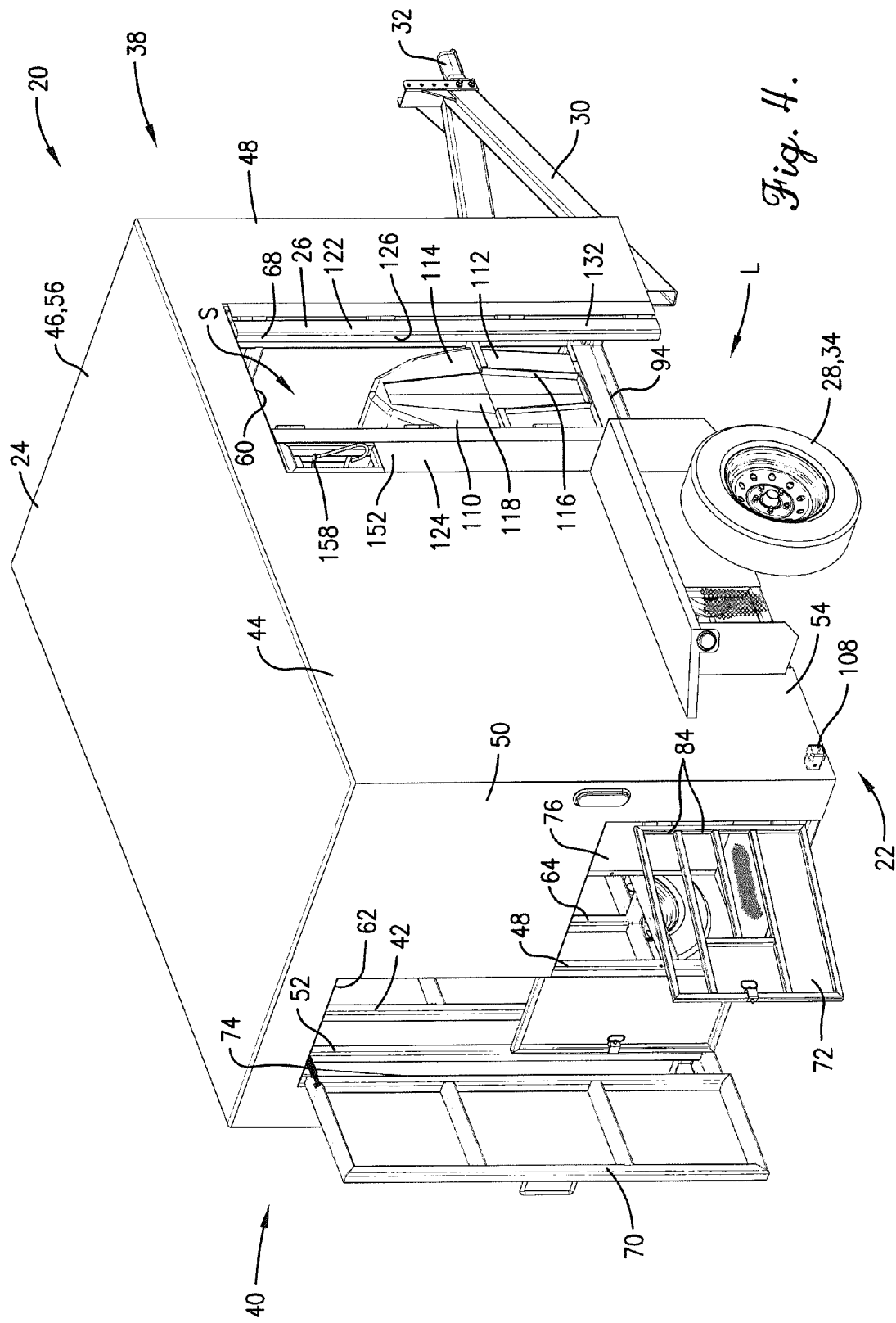
FIG. 4 is a right rear perspective of the animal treatment trailer shown in FIG. 2, but showing the sling assembly removed, the rear access door and rear compartment gate opened, and a compartment door within the enclosure opened.

The extension panel 154 includes an elongated stanchion 170 (see FIGS. 11-15) pivotally mounted to the base panel 152 at hinge joints 172 (see FIG. 1). The stanchion 170 is pivotal into and out of a retracted position where the stanchion 170 is received in a recess in the base panel 152 (see FIGS. 14 and 15). The stanchion 170 is also pivotal into and out of an extended position (see FIGS. 12 and 13). Thus, the stanchion 170 provides the adjustable side margin 128 of the doorway 66. The illustrated panel assembly 124 preferably includes two panels 152,154 that cooperatively position the side margin 128. However, for some aspects of the present invention, the panel assembly 124 could have an alternative number of panels, e.g., a single panel. Also, the panels of the dual panel assembly 124 could be alternatively shiftably mounted to front wall 48 (e.g., where one or both of the panels are mounted to slide between the extended and retracted positions). Again, for some aspects of the present invention, the panel assembly 124, or even both panel assemblies, could be fixed relative to the enclosure to restrict enclosure ingress and egress.

Turning to FIGS. 9-15, the extension panel 154 preferably includes a latch assembly 174 including a bracket 176 fixed to the stanchion 170 and a latch bar 178. The latch bar 178 includes a body 180 with a hinged end pivotally mounted to the bracket 176. The latch bar 178 also includes a pair of sockets, with an endmost socket 182 attached to the body 180 opposite the hinged end and an intermediate socket 184 attached to the body 180 between the hinged end and endmost socket 182.

The latch bar 178 is adjustable to secure the stanchion 170 to the base panel 152 in one of the extended and retracted positions. The base panel 152 includes a tubular bracket 186 adjacent the extension panel 154. The latch bar 178 is secured in the retracted position by aligning the socket 184 with the tubular bracket 186 and extending a pin 188 through the socket 184 and bracket 186. Similarly, the latch bar 178 is secured in the extended position by aligning the endmost socket 182 with the tubular bracket 186 and extending the pin 188 through the endmost socket 182 and bracket 186.

The illustrated latch mechanism is preferred for securing the extension panel 154 in one of the extended and retracted positions. However, the latch assembly 174 could be alternatively configured to secure the extension panel 154 without departing from the scope of the present invention. For instance, the latch bar 178 could be pivotally secured to the base panel 152 and selectively attached to the stanchion 170 with pin 188.

The illustrated door assembly 26 can be shifted among multiple positions to provide six distinct doorway widths. The adjustable doorway allows the care provider to customize the doorway width to permit ingress and egress of the care provider while restricting ingress by an animal. With the base panel 152 opened, the door assembly 26 provides a large width dimension W that permits a care provider to easily pass through the doorway 66 while providing minimal ingress/egress restriction (e.g., when no animal is being contained or treated within the enclosure). In this configuration, the single panel assembly 122 can be either extended (see FIG. 11) or retracted. Most preferably, in every panel configuration, the restricted doorway generally remains open. That is to say, the operator is not required to open a door when entering the enclosure. In this way, the operator is able to quickly enter the enclosure, while a cow is prevented from entering the treatment space.

With the base panel 152 closed, the extension panel 154 and single panel assembly 122 can both be shifted among extended and retracted positions to provide the remaining four doorway widths. In this manner, the care provider can carefully select a doorway width that permits ingress/egress by the care provider (and/or a young calf) while restricting ingress of other animals larger than the calf, e.g., the mother of the calf. Preferably, the width dimension W associated with the four doorway widths ranges from about thirteen (13) inches, corresponding to a minimum width of the doorway, to about nineteen (19) inches, corresponding to a maximum width of the doorway. The maximum doorway width is preferably associated with the lateral width dimension of a typical adult cow so that the doorway restricts ingress by the cow at the maximum width configuration.

In the illustrated embodiment, when both panels are extended, the width dimension W is preferably about thirteen (13) inches. When panel 154 is extended and single panel assembly 122 is retracted, the width dimension W is preferably about fifteen (15) inches. When panel assembly 122 is extended and panel 154 is retracted, the width dimension W is preferably about seventeen (17) inches. When both the panel 154 and panel assembly 122 are retracted, the width dimension W is preferably about nineteen (19) inches. Additionally, the single panel assembly 122 is entirely removable from the enclosure 24 so that the width dimension W from the retracted panel 154 to the hinge joint 134 is about twenty two (22) inches.

The illustrated door assemblies 26 are preferably configured so that the doorways 66,68 are always open. However, for some aspects of the present invention, the door assemblies 26 could include an alternative construction that further restricts the doorways (e.g., where some structure substantially spans the openings 58,60). For instance, the door assembly could include flexible curtain strips that hang across doorway and can be pivoted or flexed to permit ingress/egress through the doorway.

In operation, the care provider tows the trailer 20 to the treatment location L where the newborn calf is located. The care provider can adjust either or both of the panel assemblies 122,124 to set the width of the doorways 66,68 to a preferred dimension that permits ingress and egress by the care provider. Furthermore, when other members of a herd, such as the mother, are also nearby, the care provider can set the doorway width dimension W so that the doorways 66,68 restrict ingress by the larger herd members while permitting ingress and egress by the care provider. In either event, the care provider can grasp the newborn calf and carry or drag the calf into the enclosure. Furthermore, ingress by the care provider and calf occurs while the care provider remains on the ground (e.g., the care provider walks along the treatment location L while entering the enclosure 24). Thus, the care provider preferably enters and exits the enclosure 24 without climbing or stepping onto (or off of) the trailer 20.

Once inside the enclosure 24, the care provider can perform various treatment procedures on the calf. For instance, the calf can be placed in the warming box 110 to heat and/or dry the animal. Other procedures include vaccination and ear tag application. The calf can also be placed into the compartment 82 to hold the calf for observation, transportation of the calf, or treatment.

Alternatively, the care provider can place the calf into the sling assembly 96 for observation, transportation, or treatment. Prior to placing the calf in sling assembly 96, the care provider can selectively attach the sling assembly 96 to one of the mounts 108 in order to best position the calf. The care provider can then pivot the beam 100 relative to the bracket 98 to adjust and secure the sling at a desired height above the ground. With the calf in either the sling or compartment, the care provider can tow the trailer 20 with the calf to another location for further care of the animal.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A mobile animal care station operable to be moved to an animal treatment location, said mobile animal care station comprising:
   a wheeled chassis including an enclosure supported above the ground for movement to and from the treatment location,
   said enclosure defining a treatment space therein and presenting an opening that permits ingress and egress relative to the treatment space and presents an opening width dimension, said enclosure presenting an open bottom so that animals within the treatment space may be supported directly on the ground; and a doorway restriction mounted along at least one side of the opening to provide a doorway having a doorway width dimension that is less than the opening width dimension so as to restrict animal ingress and egress, said doorway restriction including a panel that extends along the doorway to define a panel width dimension, said panel width dimension being less than the opening width dimension so that the doorway restriction is incapable of fully spanning the width of the doorway, said doorway restriction being shiftably mounted so that the doorway is adjustably-sized.

2. The mobile animal care station as claimed in claim 1, said doorway width dimension ranging from about thirteen inches to about nineteen inches.

3. The mobile animal care station as claimed in claim 1, said mobile animal care station being devoid of structure directly below the doorway so that the doorway extends continuously from an upper end thereof to the ground without interruption.

4. The mobile animal care station as claimed in claim 1, said doorway restriction including another panel opposite the first-mentioned panel, with the panels being mounted to the enclosure along opposite sides of the opening and shiftable relative to one another to provide multiple doorway configurations, said panels each presenting a corresponding side margin so that the side margins cooperatively define a doorway width dimension.

5. The mobile animal care station as claimed in claim 4, each panel being shiftably mounted to the enclosure and shiftable between a retracted position where the doorway width is relatively small and an extended panel position where the doorway width is relatively large, with the panels thereby providing four doorway configurations with corresponding doorway widths.

6. The mobile animal care station as claimed in claim 5, said doorway restriction including a pair of latch mechanisms, with each latch mechanism being mounted to a corresponding panel and operable to adjustably secure the corresponding panel relative to the enclosure in either of the panel positions.

7. The mobile animal care station as claimed in claim 6, each panel being pivotally mounted relative to the enclosure, each latch mechanism including a strap pivotally mounted to the corresponding panel and adjustably secured relative to the enclosure into latch positions corresponding with respective retracted and extended panel positions.

8. The mobile animal care station as claimed in claim 1, said panel comprising a panel assembly with a base panel and an extension panel shiftably attached to one another, said panel assembly mounted to the enclosure along one side of the opening, with the panels being shiftable relative to one another to provide multiple doorway configurations, one of said panels presenting a side margin, with the side margin partly defining a doorway width dimension.

9. The mobile animal care station as claimed in claim 8, said base panel being shiftably supported by the enclosure and said extension panel being shiftably supported by the base panel, said panels each being shiftable between a retracted position where the doorway width is relatively small and an extended panel position where the doorway width is relatively large, with the panels thereby providing the multiple doorway configurations with corresponding doorway widths.

10. The mobile animal care station as claimed in claim 9, said doorway restriction including a pair of latch mechanisms, with each latch mechanism being mounted to a corresponding panel and operable to adjustably secure the corresponding panel relative to the enclosure in either of the panel positions.

11. The mobile animal care station as claimed in claim 10, said base panel being pivotally mounted to the enclosure and said extension panel being pivotally mounted to the base panel, at least one of the latch mechanisms including a strap pivotally mounted to the extension panel and adjustably secured to the base panel into latch positions corresponding with respective retracted and extended panel positions of the extension panel.

12. The mobile animal care station as claimed in claim 8, said doorway restriction including another panel mounted to the enclosure on an opposite side of the opening relative to the panel assembly and shiftable relative to the panel assembly to provide multiple doorway configurations, said another panel presenting another side margin so that the side margins cooperatively define the doorway width dimension.

13. The mobile animal care station as claimed in claim 1, said enclosure presenting another opening that permits ingress and egress relative to the treatment space; and another doorway restriction shiftably mounted along at least one side of the another opening to provide another adjustably-sized doorway.

14. The mobile animal care station as claimed in claim 13, said doorway restrictions being positioned on opposite sides of the enclosure and located substantially the same distance from a front end of the enclosure.

15. The mobile animal care station as claimed in claim 14, said doorway restrictions and said enclosure cooperatively providing a continuous alley that runs from one doorway to the other, said alley extending between and separating at least two sections of the enclosure, said enclosure including a truss structure that interconnects the sections and is positioned above the alley.

16. The mobile animal care station as claimed in claim 15, said wheeled chassis including a hitch and an axle assembly that supports the enclosure, said alley extending laterally in a location spaced between the hitch and axle assembly, said hitch attached to one of the at least two enclosure sections and said axle assembly attached to another of the at least two enclosure sections.

17. The mobile animal care station as claimed in claim 1, said enclosure including a roof structure that covers the treatment space, said roof structure including a translucent panel that allows ambient light into the treatment space.

18. The mobile animal care station as claimed in claim 1, said enclosure including side walls and a bottom wall that define an animal holding compartment, said enclosure including a gate that separates the holding compartment from outside the enclosure, said gate shiftably attached relative to the side walls and shiftable between open and closed positions to permit selective access to the compartment from outside the enclosure, said enclosure including a door that separates the holding compartment from the treatment space, said door shiftably attached relative to the side walls and shiftable between open and closed door positions to permit selective access to the compartment from the treatment space.

19. The mobile animal care station as claimed in claim 1; and a calf-holding assembly supported by the enclosure, said calf-holding assembly including a beam shiftably mounted relative to the enclosure and a sling supported by the beam.

20. The mobile animal care station as claimed in claim 1; and an animal warming station supported by the enclosure and located adjacent the doorway and within the treatment space, said animal warming station including a housing to receive an animal.

21. The mobile animal care station as claimed in claim 1; and a generator supported by the enclosure and located within the treatment space to provide electrical power for the mobile animal care station.

22. A mobile animal care station operable to be moved to an animal treatment location, said mobile animal care station comprising:

a wheeled chassis including an enclosure supported above the ground for movement to and from the treatment location, said enclosure defining a treatment space therein and presenting a restricted access doorway that permits operator ingress and egress relative to the treatment space, said enclosure presenting an open bottom so that animals within the treatment space may be supported directly on the ground, said doorway having a maximum doorway width dimension of about nineteen inches, said mobile animal care station being devoid of structure directly below the doorway so that the doorway extends continuously from an upper end thereof to the ground without interruption.

23. The mobile animal care station as claimed in claim 22; and a door assembly shiftably mounted relative to the enclosure such that the doorway is adjustably-sized.

24. The mobile animal care station as claimed in claim 23, said doorway having a minimum doorway width dimension of about thirteen inches.

25. The mobile animal care station as claimed in claim 23, said door assembly including a panel mounted along at least one side of the doorway to at least partly define the doorway width dimension.

26. The mobile animal care station as claimed in claim 25, said door assembly including another panel opposite the first-mentioned panel, with the panels being mounted to the enclosure along opposite sides of the doorway and shiftable relative to one another to provide multiple doorway configurations, said panels each presenting a corresponding side margin so that the side margins cooperatively define the doorway width dimension.

27. The mobile animal care station as claimed in claim 26, each panel being shiftably mounted to the enclosure and shiftable between a retracted position where the doorway width is relatively small and an extended panel position where the doorway width is relatively large, with the panels thereby providing four doorway configurations with corresponding doorway widths.

28. The mobile animal care station as claimed in claim 27, said door assembly including a pair of latch mechanisms, with each latch mechanism being mounted to a corresponding panel and operable to adjustably secure the corresponding panel relative to the enclosure in either of the panel positions.

29. The mobile animal care station as claimed in claim 28, each panel being pivotally mounted relative to the enclosure, each latch mechanism including a strap pivotally mounted to the corresponding panel and adjustably secured relative to the enclosure into latch positions corresponding with respective retracted and extended panel positions.

30. The mobile animal care station as claimed in claim 23, said door assembly including a panel assembly with a base panel and an extension panel shiftably attached to one another, said panel assembly mounted to the enclosure along one side of the doorway, with the panels being shiftable relative to one another to provide multiple doorway configurations, one of said panels presenting a side margin, with the side margin partly defining a doorway width dimension.

31. The mobile animal care station as claimed in claim 30, said base panel being shiftably supported by the enclosure and said extension panel being shiftably supported by the base panel, said panels each being shiftable between a retracted position where the doorway width is relatively small and an extended panel position where the doorway width is relatively large, with the panels thereby providing the multiple doorway configurations with corresponding doorway widths.

32. The mobile animal care station as claimed in claim 31, said door assembly including a pair of latch mechanisms, with each latch mechanism being mounted to a corresponding panel and operable to adjustably secure the corresponding panel relative to the enclosure in either of the panel positions.

33. The mobile animal care station as claimed in claim 32, said base panel being pivotally mounted to the enclosure and said extension panel being pivotally mounted to the base panel, at least one of the latch mechanisms including a strap pivotally mounted to the extension panel and adjustably secured to the base panel into latch positions corresponding with respective retracted and extended panel positions of the extension panel.

34. The mobile animal care station as claimed in claim 30, said door assembly including another panel mounted to the enclosure on an opposite side of the doorway relative to the panel assembly and shiftable relative to the panel assembly to provide multiple doorway configurations, said another panel presenting another side margin so that the side margins cooperatively define the doorway width dimension.

35. The mobile animal care station as claimed in claim 23, said enclosure presenting another restricted access doorway that permits ingress and egress relative to the treatment space; and another door assembly shiftably mounted relative to the enclosure such that the another doorway is adjustably-sized.

36. The mobile animal care station as claimed in claim 35,
said door assemblies being positioned on opposite sides of the enclosure and located substantially the same distance from a front end of the enclosure.

37. The mobile animal care station as claimed in claim 36,
said door assemblies and said enclosure cooperatively providing a continuous alley that runs from one doorway to the other,
said alley extending between and separating at least two sections of the enclosure,
said enclosure including a truss structure that interconnects the sections and is positioned above the alley.

38. The mobile animal care station as claimed in claim 37,
said wheeled chassis including a hitch and an axle assembly that supports the enclosure,
said alley extending laterally between the hitch and axle assembly.

* * * * *